June 1, 1954 H. H. TRAIL 2,679,728
COOLING SYSTEM FOR ROTARY HYDRAULIC COUPLINGS
Filed March 24, 1950 3 Sheets-Sheet 1

INVENTOR.
HERBERT H. TRAIL
BY
*Kenyon & Kenyon*
ATTORNEYS

June 1, 1954  H. H. TRAIL  2,679,728
COOLING SYSTEM FOR ROTARY HYDRAULIC COUPLINGS
Filed March 24, 1950  3 Sheets-Sheet 2
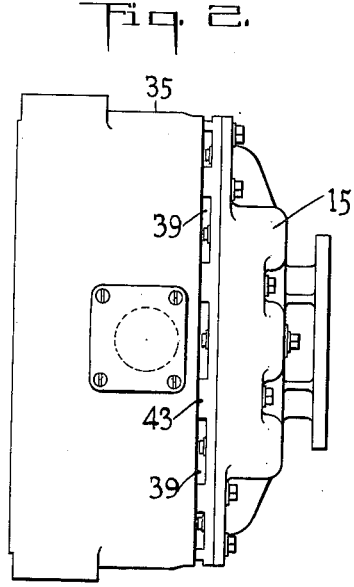
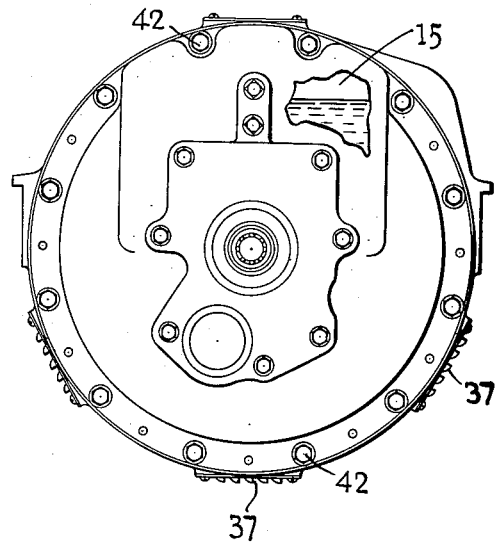
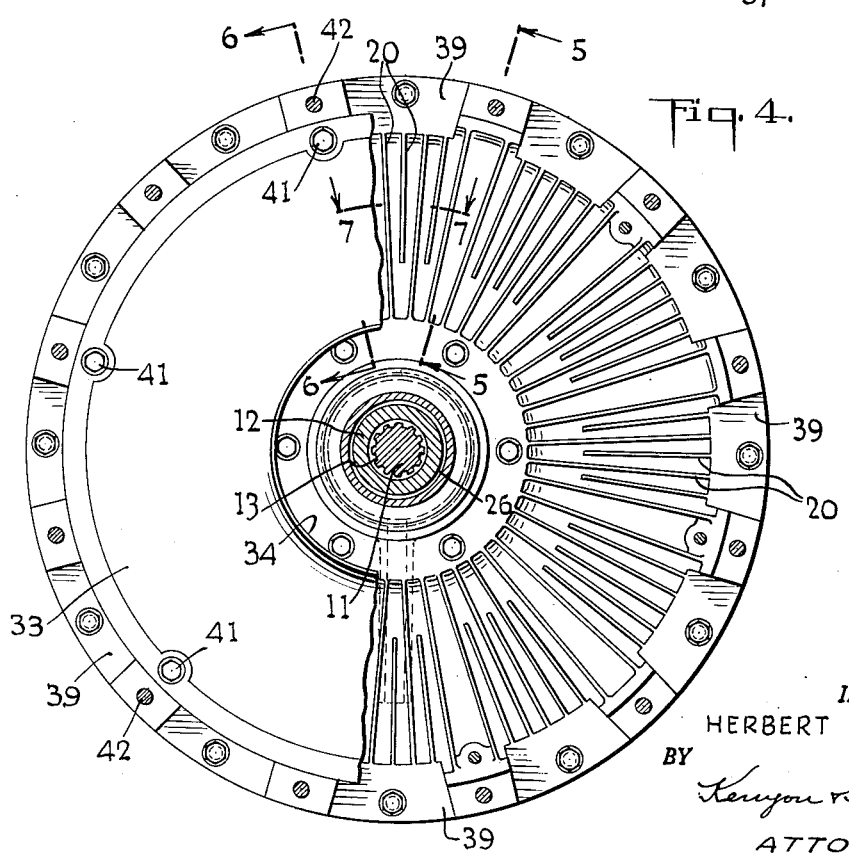
INVENTOR.
HERBERT H. TRAIL
BY
ATTORNEYS INVENTOR.
HERBERT H. TRAIL
BY
Kenyon & Kenyon
ATTORNEYS Patented June 1, 1954

2,679,728

UNITED STATES PATENT OFFICE 2,679,728

COOLING SYSTEM FOR ROTARY
HYDRAULIC COUPLINGS

Herbert H. Trail, Long Beach, Calif., assignor to
Fuller Manufacturing Company, Kalamazoo,
Mich., a corporation of Delaware Application March 24, 1950, Serial No. 151,580

4 Claims. (Cl. 60—54)

This invention relates to hydraulic transmissions and particularly to such transmissions which are provided with a simple, effective cooling system which will adequately cool the transmission and the hydraulic fluid employed therein so as to avoid the difficulties resultant from overheating.

An object of the invention is to provide such a transmission with a simple and effective cooling system.

Another object is to provide such a transmission with a cooling system which operates positively both on the transmission members themselves and on the expansion storage tank for the fluid.

Another object is to provide such a transmission with a built-in air cooling system which is positive in its operation and which may be easily and inexpensively provided.

Other objects and advantages of the invention will be apparent from the preferred form of the transmission which is illustrated in the accompanying drawings, in which:

Fig. 2 is an elevational view of the transmission shown in Fig. 1;

Fig. 3 is an elevational view from the right end of the transmission shown in Fig. 1;

Fig. 4 is a detailed sectional view taken on the line 4—4 of Fig. 1;

Figure 1:
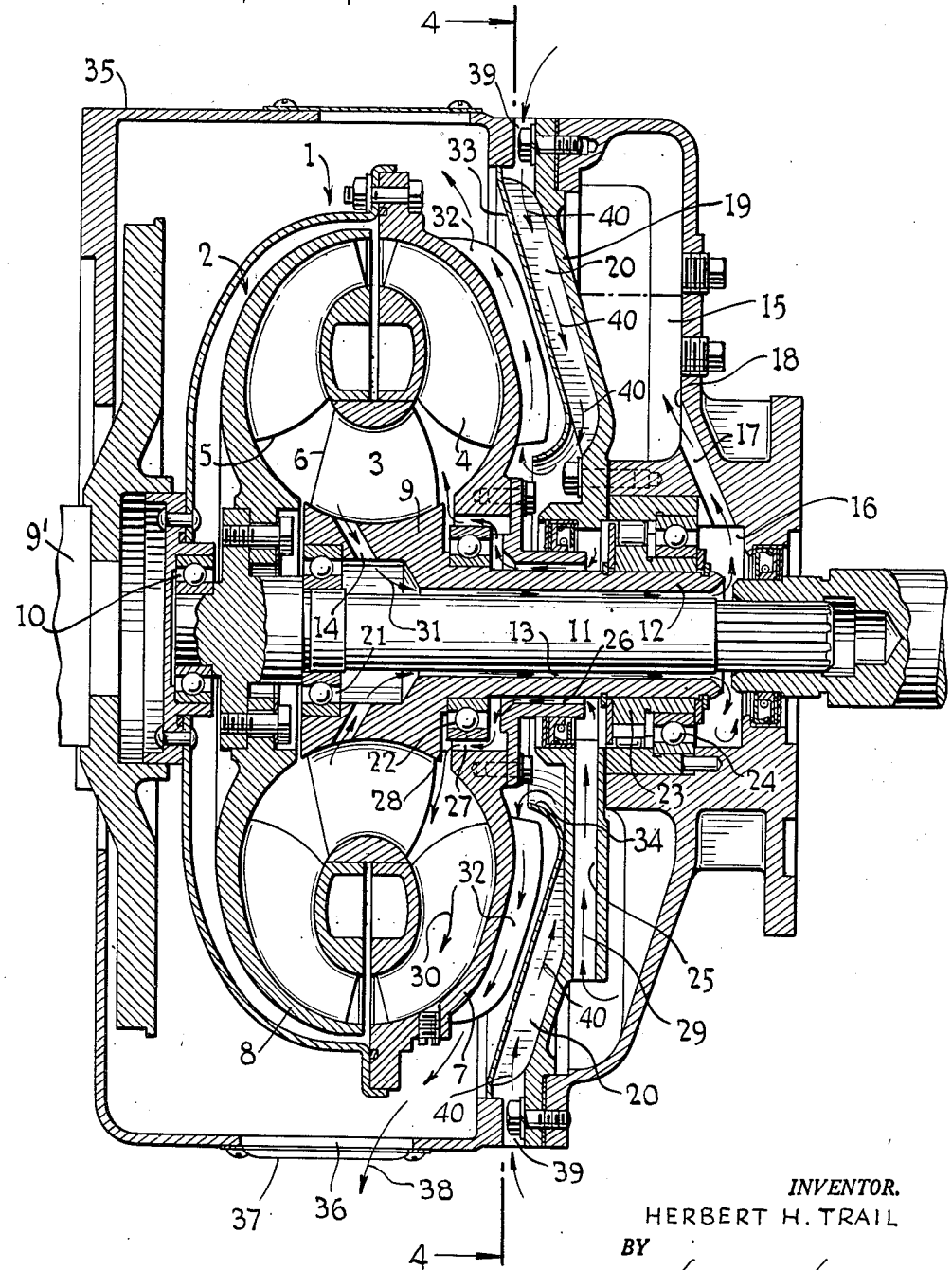
Fig. 1 is a detailed sectional view through a hydraulic transmission embodying the invention.
Figure 5:
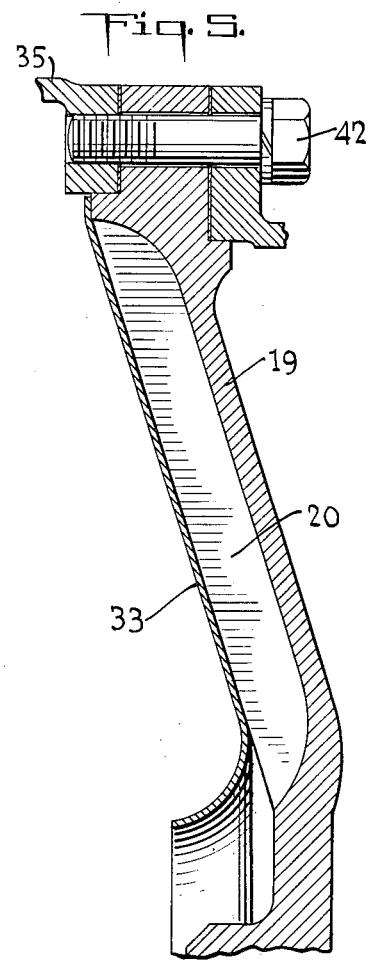
Fig. 5 is a detailed sectional view taken on the line 5—5 of Fig. 4.
Figure 6:
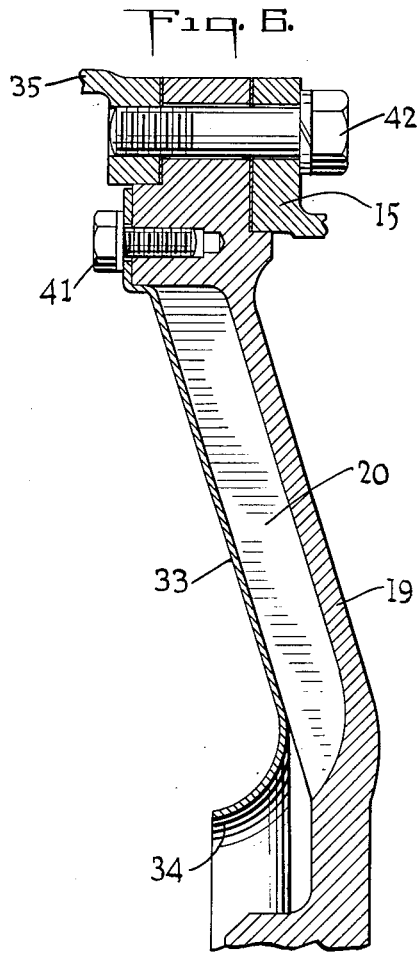
Fig. 6 is a detailed sectional view taken on the line 6—6 of Fig. 4.
Figure 7:
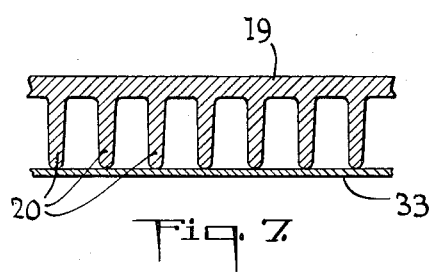
Fig. 7 is a detailed sectional view taken on the line 7—7 of Fig. 4.

The invention consists generally of a hydraulic transmission of the type in which a plurality of rotors which are rotatable about the axis of the transmission have outer walls which enclose a substantially toroidal hydraulic fluid circulating space which is concentric with the axis of the transmission and in which an expansion or storage chamber for the hydraulic fluid is provided and there are means for circulating the hydraulic fluid between the toroidal space and the expansion chamber and in which an air passage extends in heat-exchange relationship with the toroidal space and the expansion chamber and a fan is provided on one of the rotors of the transmission to positively move air through the passage.

The invention illustrated in the preferred form in the drawings is applied to a combined torque converter and hydraulic coupling. This torque converter coupling is provided with a plurality of rotors, namely, an impeller 1, a runner 2 and a reaction member 3, provided, respectively, with vanes 4, 5 and 6 and outer walls 7, 8 and 9 which form a substantially toroidal fluid circulating space having therein a substantially toroidal core which defines the path of fluid flow.

The impeller 1 is carried by a driving member 9' and is provided with an anti-friction bearing 10 in which the end of the shaft 11 which carries the runner 2 is journalled. The reaction member 3 is mounted on a sleeve 12 which surrounds the shaft 11 in concentric spaced relationship to provide a passage 13 for oil circulating from the toroidal space formed by the rotors through a passage 14 which is located at a high pressure area in the toroidal space so that the hydraulic fluid will be forced from the toroidal space for circulation to the expansion tank 15, which connects with the passage 13 through a chamber 16 and a passage 17 which terminates at 18 in an inlet which directs the hydraulic fluid in the direction generally toward the wall 19 of the expansion chamber which is disposed transversely of the transmission and which is provided with a plurality of heat-exchange fins 20, which extend generally radially of the transmission and serve to assist in the cooling of hydraulic fluid as it circulates through the system in a manner which will be described later. In the preferred form of the invention as shown in the drawings, this passage 17 is directed upwardly and at an angle toward the wall 19 so that the hydraulic fluid discharge is spread in such a manner that it flows over a substantial area of the wall 19 to provide efficient heat transfer.

The sleeve 12 is mounted in bearings 21 which engage the shaft 11 and in bearings 22 which lie between the sleeve 12 and the impeller 1. It is also provided with an overrunning clutch 23 and bearings 24 which form no part of this invention but which serve to hold the reaction member in fixed position during the operation of the transmission as a torque converter but permit free rotation of the reaction member during operation of the transmission as a coupling. A discharge 25 from the expansion or storage member 15 opens into a passage 26 which is concentric with and surrounds the sleeve 12 and opens into passages 27 which by-pass the bearing 22 and open through passage 28 into a low pressure area of the toroidal space so that fluid following the path indicated by the arrows 29 will flow from the expansion chamber into the toroidal space due to the action of the impeller 1 which tends to throw the hydraulic fluid outwardly as indicated by the arrows 30. The circulation of the hydraulic fluid through the passage 14 is indicated by arrows 31.

This arrangement of passages connecting the toroidal space with the expansion chamber and opening into the low pressure area of the toroidal space and out of the high pressure area of the toroidal space causes a steady circulation of hydraulic fluid.

A plurality of generally radially extending vanes 32 are formed integrally on the outer wall 7 of the impeller 1 and particularly on that portion of the wall which extends radially and transversely of the transmission. These vanes form an air impeller which cooperates with a partition 33 which extends transversely of the transmission adjacent the sides of the vanes 32 to form a fan casing. Partition 33 is disposed in a generally radial direction transversely of the transmission and is provided with a central aperture 34 which lies adjacent the inner ends of the vanes 32 to form a fan inlet, which discharges into the eye of the air impeller formed by the vanes 32. The partition 33 is spaced from the wall 19 of the expansion chamber to form an air passage which leads past the wall 17 and generally inwardly from the periphery of the transmission. The fins 20 on this partition lie in the passage and serve as heat-exchange members so that air passing through the passage will exert maximum cooling effect upon the expansion chamber and the hydraulic fluid therein which is discharged generally by the inlet 18 toward the wall 19 in such a way as to provide prompt heat exchange with the heated fluid coming from the toroidal space.

A casing 35 surrounds the transmission. It is provided with discharge openings 36 which are provided with louvers 37 to permit air moved by the vanes 32 to flow outwardly, as indicated by the arrows 38. The periphery of the casing is also provided with inlet ports 39 which open into the space formed between the partition 33 and the wall 19 of the cover plate to permit air to flow inwardly therethrough, as indicated by the arrows 40.

In the form of the invention shown the partition 33 is secured to the periphery of the wall 19 by bolts 41 and lies against the edges of the fins 20. The casing 35 is joined to the expansion chamber 15 at the wall 19 by means of bolts 42. The inlet openings 39 are formed through spaced bosses 43 which engage the casing.

In the operation of the transmission power is employed to rotate the impeller 1 which causes the fluid to move outwardly, as indicated by the arrows 30, and around to the runner 2 to drive the same, thence through the reaction member and back through the impeller. A steady stream of hydraulic fluid flows out from the high pressure area of the toroidal space through the passage 14 and thence to the expansion chamber 15, as above described. Fluid in the expansion chamber circulates back through the discharge 25 to the inlet 28 to the low pressure area of the toroidal space. The rotation of the impeller 1 likewise causes the vanes 32 to throw air outwardly by centrifugal force and through the discharge openings 36 as in ordinary centrifugal fan operation. The vanes 32 being formed integrally on the outer wall 7 of the impeller 1 serve not only as fan blades but as heat-exchanging fins to facilitate the cooling of the impeller and the hydraulic fluid being driven around the toroidal space formed by the impeller 1, the runner 2 and the reaction member 3. As the air is thrown centrifugally outward by the rotation of the impeller 1 and the vanes 32 a low pressure area is created at the inner ends of the vanes 32. This causes a flow of air through the inlets 39 and between the partition 33 and the wall 19 of the expansion chamber 15. The air passing over the wall 19 and the heat-exchanger fins 20 tends to cool the wall 19 of the expansion chamber 15 and the hydraulic fluid in the expansion chamber, which is brought into and maintained in heat-exchanging relationship with the wall 19 in part because the direction of discharge of the inlet 18 into the expansion chamber.

By employing the particular construction shown it is possible to provide a highly efficient and adequate air cooling system for hydraulic transmissions of the type described. The air is moved positively through the cooling passages past both the working toroidal space and past the expansion chamber and no dependence is placed on the movement of a vehicle provided with the transmission to provide the necessary heat-exchange cooling effect of the air. By mounting the vanes 32 on the impeller, the supply of air is maintained even at low speeds when the transmission is operating as a torque converter with lower rotational speed on the runner.

The vanes may be simply and easily provided by casting them on the outer wall of the impeller and the partition may be a simply formed sheet metal member. The installation costs are minimum.

The preferred form of the invention has been described. It will be apparent, however, that other forms of the invention may be employed and there is no intention of being limited to the specific embodiment of the invention shown in the drawings. It is intended only to be limited to the invention described in the appended claims.

I claim:

1. In a hydraulic transmission, a plurality of rotors rotatable about an axis and having outer walls enclosing a substantially toroidal hydraulic fluid circulating space concentric with said axis, one of said rotors having its outer wall with a radial portion extending transversely of said axis, a plurality of generally radially extending vanes on said radial portion of said outer wall forming an air impeller, a transverse wall disposed about said axis adjacent said vanes and having a central aperture opening to the inner ends of said vanes to form an air impeller inlet, means supporting said wall, an expansion chamber having a cooling wall extending transversely of said axis and spaced from said wall and on the side thereof away from said rotors to form an air passage and having a plurality of generally radially extending fins extending into said passage, and means for circulating hydraulic fluid from said toroidal space to said expansion chamber comprising a passage from said chamber to a low pressure section of said toroidal space and a passage from a high pressure section of said toroidal space to said chamber, including an inlet to said chamber directed toward its said cooling wall.

2. In a hydraulic transmission, a plurality of rotors rotatable about an axis and having outer walls enclosing a substantially toroidal hydraulic fluid circulating space concentric with said axis, one of said rotors having its outer wall with a radial portion extending transversely of said axis, a plurality of generally radially extending vanes on said radial portion of said outer wall forming an air impeller, a transverse wall disposed about said axis adjacent said vanes and having a central aperture opening to the inner ends of said vanes to form an air impeller inlet, an expansion chamber having a cooling wall extending transversely of said axis and spaced from said transverse wall and on the side thereof away from said rotors to form an air passage and having a plurality of generally radially extending fins extending into said passage, a casing for said transmission engaging the outer edge of said transverse wall and having inlet means opening into said air passage and outlet means adjacent the outer periphery of said air impeller, and means for circulating hydraulic fluid from said toroidal space to said expansion chamber comprising a passage from said chamber to a low pressure section of said toroidal space and a passage from a high pressure section of said toroidal space to said chamber including an inlet to said chamber directed toward its said cooling wall.

3. The hydraulic transmission as claimed in claim 1 in which the inlet to the expansion chamber is directed upwardly and at an angle toward the cooling wall of the expansion chamber which extends transversely of the transmission whereby fluid discharged from said inlet is spread over a substantial area of said cooling wall to facilitate heat exchange.

4. The hydraulic transmission as claimed in claim 2 in which the inlet to the expansion chamber is directed upwardly and at an angle toward the cooling wall of the expansion chamber which extends transversely of the transmission whereby fluid discharged from said inlet is spread over a substantial area of said cooling wall to facilitate heat exchange.

References Cited in the file of this patent

UNITED STATES PATENTS

| Number | Name | Date |
|---|---|---|
| 2,143,312 | Griswold | Jan. 10, 1939 |
| 2,164,173 | Durrell et al. | June 27, 1939 |
| 2,168,862 | De Lavaud | Aug. 8, 1939 |
| 2,202,243 | Alison | May 28, 1940 |
| 2,334,282 | Peterson et al. | Nov. 16, 1943 |
| 2,340,494 | Smirl | Feb. 1, 1944 |
| 2,363,983 | Miller | Nov. 28, 1944 |
| 2,379,015 | Lysholm | June 26, 1945 |
| 2,457,692 | La Brie | Dec. 28, 1948 |
| 2,585,149 | McGill | Feb. 12, 1952 |